(12) United States Patent
Cortequisse

(10) Patent No.: US 9,670,936 B2
(45) Date of Patent: Jun. 6, 2017

(54) TURBOMACHINE STATOR INTERNAL SHELL WITH ABRADABLE MATERIAL

(71) Applicant: Techspace Aero S.A., Herstal (Milmort) (BE)

(72) Inventor: Jean-François Cortequisse, Heers (BE)

(73) Assignee: Safran Aero Boosters SA, Herstal (Milmort) (BE)

( * ) Notice: Subject to any disclaimer, the term of this patent is extended or adjusted under 35 U.S.C. 154(b) by 453 days.

(21) Appl. No.: 14/274,454

(22) Filed: May 9, 2014

(65) Prior Publication Data

US 2014/0334920 A1    Nov. 13, 2014

(30) Foreign Application Priority Data

May 10, 2013    (EP) .................................... 13167301

(51) Int. Cl.
| | |
|---|---|
| *F01D 11/00* | (2006.01) |
| *F04D 29/16* | (2006.01) |
| *F01D 9/04* | (2006.01) |
| *F01D 25/24* | (2006.01) |

(52) U.S. Cl.
CPC ........... *F04D 29/161* (2013.01); *F01D 9/041* (2013.01); *F01D 11/001* (2013.01); *F01D 25/24* (2013.01); *Y02T 50/672* (2013.01); *Y02T 50/673* (2013.01)

(58) Field of Classification Search
CPC ........ F01D 11/001; F01D 25/24; F01D 9/041; F04D 29/161; Y02T 50/672; Y02T 50/673
See application file for complete search history.

(56) References Cited

U.S. PATENT DOCUMENTS

| | | | | |
|---|---|---|---|---|
| 3,941,500 A | * | 3/1976 | Glenn | F01D 11/025 277/420 |
| 5,462,403 A | * | 10/1995 | Pannone | F01D 9/042 415/173.1 |
| 7,695,244 B2 | * | 4/2010 | Au | F01D 9/04 415/174.4 |
| 2012/0301315 A1 | | 11/2012 | Alvanos | |

(Continued)

FOREIGN PATENT DOCUMENTS

| | | |
|---|---|---|
| EP | 1293645 A1 | 3/2003 |
| FR | 2979662 A1 | 3/2013 |

OTHER PUBLICATIONS

European Search Report dated Oct. 9, 2013 for EP 13167301.4.

*Primary Examiner* — Jesse Bogue
(74) *Attorney, Agent, or Firm* — James E. Walton

(57) ABSTRACT

The present application relates to a compression stage of a low-pressure compressor of an axial turbomachine, such as a turboprop. The stage includes a rotor with, on its outer surface, two lip seals, each forming a radial annular rib; and a stator which includes an annular row of stator blades extending substantially radially; and an inner shell whose radial cross section includes a central part connected to the inner tips of the blades, a lateral part extending from each side of the central part to one of the two lip seals, respectively, thus forming a rotor with the annular cavity. The shell and the rotor are configured so that the radial section of the annular cavity has a length L1 and a height H, the length L1 being greater than the height H, which initiates rotational movement of the air contained therein. The speed of the air reduces its pressure, which limits downstream to upstream leaks.

20 Claims, 3 Drawing Sheets

(56) References Cited

U.S. PATENT DOCUMENTS

| | | | |
|---|---|---|---|
| 2013/0108427 A1* | 5/2013 | Brassine | B29C 45/16 415/200 |
| 2013/0183150 A1* | 7/2013 | Batt | F01D 11/003 415/214.1 |
| 2014/0079552 A1* | 3/2014 | Englebert | F01D 5/3053 416/193 A |
| 2014/0147262 A1* | 5/2014 | Grelin | F01D 11/001 415/191 |
| 2014/0377070 A1* | 12/2014 | Penalver Castro | F01D 5/063 416/174 |

* cited by examiner

TURBOMACHINE STATOR INTERNAL SHELL WITH ABRADABLE MATERIAL

This application claims priority under 35 U.S.C. §119 to European Patent Application No. 13167301.4, filed 10 May 2013, titled "Turbomachine Stator Internal Shell with Abradable Material," which is incorporated herein by reference for all purposes.

BACKGROUND

1. Field of the Application

The present application relates to an axial turbomachine fitted with a compressor. More specifically the present application relates to a compression stage for an axial turbomachine compressor. More specifically the present application relates to the sealing of a compression stage for an axial turbomachine compressor.

2. Description of Related Art

An axial turbomachine compressor usually has several compression stages, each of which is formed by the combination of a rotor blade row and a stator blade row. In order to channel the flow axially in the compression stage, the latter has coaxial shells. In particular, each stator blade row is provided with an internal shell which is fixed to the inner tips of the stator blades. Such an inner shell has an annular shape and surrounds the rotor. Some functional play where they join is part of the design.

In operation, leakage can occur between the rotor and the inner shell because of this play. This leakage tends to reduce the effective compression of each compression stage and reduces the pressure at the compressor outlet. To enhance the output pressure axial turbomachines compressors are fitted with seals. These devices can be fitted at each compression stage, at the interface between the inner shell and the rotor.

They may include an annular layer of abradable material which is advantageously fitted on the stator in order to reduce the rotating mass. This is intended to mate abrasively with lip seals or annular slats which are formed on the outer surface of the rotor. To save material, the layer of abradable material can be divided into two annular layers. They are arranged upstream and downstream of the inner shell. The latter may have the shape of an inverted "U", the inner ends of the branches of which support layers of abradable material. This "U" shape is a recess which saves weight.

U.S. Pat. No. 7,695,244 B2 discloses a bladed compressor with an inner shell. The latter is formed with a central platform and two radial extensions terminating in return walls. The return walls each have annular bands of abradable material that are intended to come into contact with the lip seals formed on a radial rotor. The platform, the extensions and the return walls define a cavity that is large in comparison with that defined between the lip seals. This cavity configuration forms a reservoir to stem a localized and short leak. However, it is not possible to significantly improve the seal between the inner shell and the rotor during steady state operation.

Although great strides have been made in the area of axial compressors, many shortcomings remain.

DETAILED DESCRIPTION OF THE PREFERRED EMBODIMENT

Figure 1:
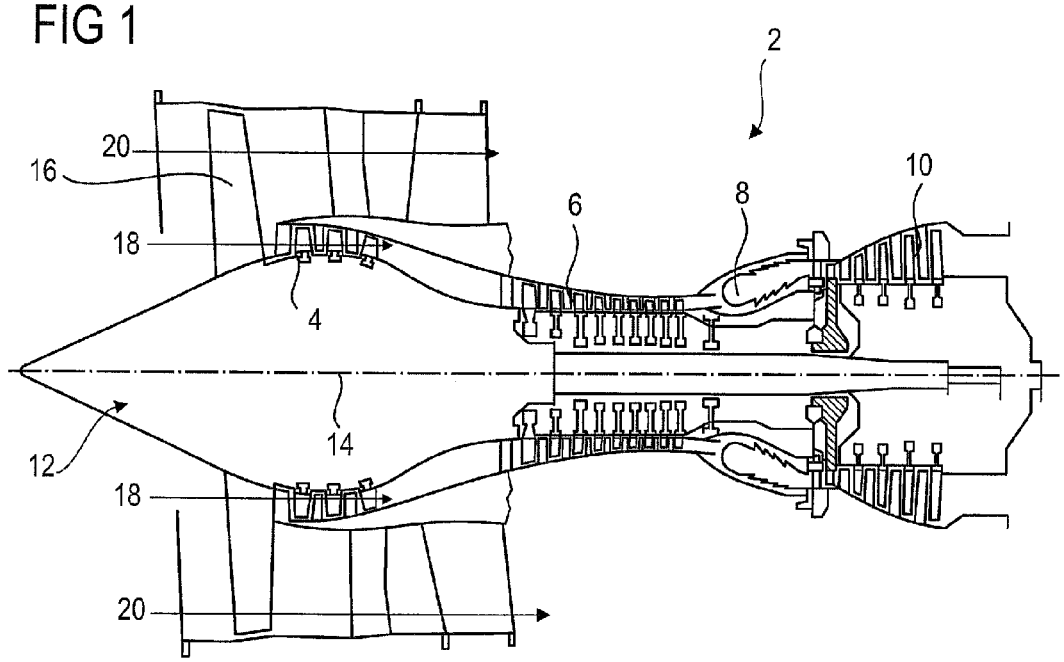
FIG. 1 shows an axial turbomachine in accordance with the present application.

The present application aims to solve at least one of the technical problems presented by the prior art. More specifically, the present application aims to increase the outlet pressure of an axial compressor fitted with stators with internal shells mating with the outer surface of the rotor. More specifically, the present application aims to reduce leaks in a compression stage of an axial compressor. The present application also aims to lighten the compressor of an axial turbomachine.

The present application relates to a compressor stage of an axial turbomachine, comprising a rotor whose outer surface has at least two lip seals, each forming a radial annular rib; and a stator which includes an annular array of stator blades extending essentially radially; and an inner shell whose radial section comprises a central part connected to the inner tips of the blades, a lateral part extending from each side of the central part to at least one of the two lip seals, respectively, thereby forming an annular cavity with the rotor; wherein the shell and the rotor are designed so that the radial section of the annular cavity has a length L1 and a height H, the length L1 being greater than the height H.

The length L1 of the radial section of the cavity is measured along the axis of rotation of the compression stage, the height H of the radial section of the cavity is measured radially.

The annular cavity is a chamber in which a circular flow is generated by the outer rotor surface. The speed of the circular flow allows the pressure to be lowered so as reduce leakage to the outside. Furthermore, the elongated shape of the radial section of the annular cavity serves to damp small localised leaks that may attempt to pass back beneath the inner shell. The elongated shape of the annular cavity can increase the efficiency of the motion of the air therein. By reducing the height of the cavity relative to its length, the proportion of air set in motion in the cavity is increased as is the mean speed of this air.

According to an advantageous embodiment of the present application, the length L1 of the annular cavity is greater than twice, preferably three times the height H of the said cavity.

According to an advantageous embodiment of the present application, each of the lateral parts has an axial sub-part, the said sub-parts extending in opposite directions up to their respective lip seals.

According to an advantageous embodiment of the present application the lateral parts diverge from each other from the central part towards the rotor.

According to an advantageous embodiment of the present application, the inner shell is made of a composite material.

According to an advantageous embodiment of the present application, the height H of the annular cavity is constant over most of its length, preferably over 70% of its length, more preferably over 80%.

According to an advantageous embodiment of the present application, the ends of the lateral parts have inner annular grooves designed to house a layer of abradable material; preferably the annular grooves have inverted "U" or "L" sections; preferably the stage comprises layers of abradable material fitted in the annular grooves.

According to an advantageous embodiment of the present application, the inner tips of the blades extend inside the inner shell.

The lateral parts and/or the axial parts define annular chambers. These annular chambers open onto one another and/or the cavity. Although they are connected, the axial flow beneath the inner shell is slowed down by circular bottlenecks demarcating these chambers and the annular cavity. Thus, a flow that crosses them undergoes a series of pressure losses that will hinder its progress.

The presence of the blades beneath the inner shell form aerodynamic obstacles beneath the inner shell. In combination with the rotating flow in the annular cavity which is drawn in by the rotor, new disturbances are created. These increase the absolute speed of the fluid, which further lowers the pressure.

According to an advantageous embodiment of the present application, the chords of the ends of the blades beneath the inner shell are inclined by more than 5°, preferably by more than 10°, more preferably by more than 25° to the axis of rotation of the rotor.

The inclination of the chords of the blades relative to the axis of rotation of the compressor force part of the flow to bypass the upstream part of the blade beneath the inner shell. This flow also creates vortices which further lower the pressure in the annular cavity.

According to an advantageous embodiment of the present application, the rotor has a wall with a profile of revolution which comprises a first part located opposite the inner surface of the shell and a second part raised relative to the first part, designed to provide support for fixing an annular rotor blade row, and a joint connecting the first part to the second part, the second part at least partially axially overlapping one of the lateral parts of the inner shell, the wall preferably comprising a third part raised relative to the first part and opposite the second part, the said third part axially overlapping at least partially the other of the two lateral parts of the shell.

According to an advantageous embodiment of the present application, the third part axially overlaps the majority of the associated lateral part, preferably overlapping it by more than 80%, more preferably it overlaps it by more than 95%.

According to an advantageous embodiment of the present application, the third part extends axially to the central part located opposite.

According to an advantageous embodiment of the present application, one of the lateral parts extends axially up to the joint at a distance D2; preferably the joint is a first joint and the rotor wall profile comprises a second joint opposite the first joint relative to the inner shell, the other of the two lateral parts of the shell extending axially to the second joint at a distance D2.

According to an advantageous embodiment of the present application, the height of the lip seals is less than 50%, preferably 30%, more preferably 15% of the height of the lateral parts of the shell.

According to an advantageous embodiment of the present application, the outer surface of the rotor forming the annular cavity has a roughness Ra greater than 2 microns, preferably greater than 6.4 microns, more preferably greater than 15 microns to cause air to be drawn into the said cavity. The surface roughness Ra is the integral mean of the differences in absolute value.

According to an advantageous embodiment of the present application, the distance D3 between the inner tips of the stator blades and the rotor is equal to the thickness of the layers of abradable materials measured at the lip seals; preferably the distance D3 is substantially greater than the thickness of the layers of abradable materials; preferably the distance D3 between 0.50 mm and 5.00 mm.

According to an advantageous embodiment of the present application, the rotor comprises a wall extending substantially axially between the lip seals.

The configuration of the compressor stage means the lips seals can be shortened. When these are made of metal and the shell is made of composite material the assembly becomes lighter.

According to an advantageous embodiment of the present application, the lateral parts are designed to lightly graze the lip seals during the operation of the next stage in accordance with predefined operating conditions.

According to an advantageous embodiment of the present application, the central part and the lateral parts extend substantially in a straight line, the lateral parts being inclined relative to the central part.

According to an advantageous embodiment of the present application, the lateral parts are inclined at more than 20° to the central part, preferably more than 45°, more preferably more than 60°.

According to an advantageous embodiment of the present application, the shell is segmented.

According to an advantageous embodiment of the present application, the radial section of the shell is materially continuous.

According to an advantageous embodiment of the present application, the radial section of the shell is substantially thin; its thickness is less than 5.00 mm, preferably less than 2.00 mm.

According to an advantageous embodiment of the present application, the outer surface of the rotor is substantially cylindrical or conical between the lip seals.

According to an advantageous embodiment of the present application, the distance D2 is between 1.00 mm and 10.00 mm, preferably between 2.00 mm and 5.00 mm.

According to an advantageous embodiment of the present application, the outer surfaces of the third part of the rotor wall and the central part of the inner shell are extensions of one another when in operation.

According to an advantageous embodiment of the present application, at rest the inner radial ends of the lateral parts extend axially up to the joint of the rotor wall profile, preferably to less than 5.00 mm, more preferably to less than 2.00 mm, more preferably to less than 0.50 mm.

According to an advantageous embodiment of the present application, the surface of the rotor between the sets of lip seals is rough machined or sandblasted.

The present application also relates to an axial compressor having at least one compression stage, wherein the compression stage is in accordance with the present application.

The present application also relates to an axial turbomachine, such as a turboprop, comprising a compressor with at least one compression stage, wherein the or at least one compression stage is in accordance with the present application.

According to an advantageous embodiment of the present application, the turbomachine includes a cylindrical housing extending axially along the length of the rotor, the rotor comprises a one-piece drum and the housing essentially comprises two half-shells, or the rotor and the housing both comprise axial segments assembled axially.

The present application reduces leakage between the inner shell and the rotor. The shape of the annular cavity damps and slows down the progress of a localised flow attempting to move upstream. Its elongated shape increases the distance to be traversed in order to escape.

The extensions beneath the inner shell enable the circumferential flow in the annular cavity to be modified. Recirculation and the vortices formed resist leakage by reducing the pressure in the cavity.

The choice of materials, combined with the architecture proposed by the present application, is used to lighten the stage by reducing the quantity of resistive materials that are required. The reduction in the height of the lip seals also enables raw materials to be saved. Manufacturing costs can also be reduced because axial access to the platforms is simplified in order, for example, to undertake machining there.

In the following description, the terms inner and outer refer to a position relative to the axis of rotation of an axial turbomachine.

FIG. 1 shows an axial turbomachine. In this case it is a dual-flow turboprop 2; it could also be a turbojet 2. The turboprop 2 comprises a first compression stage, a so-called low-pressure compressor 4, a second compression stage, a so-called high pressure compressor 6, a combustion chamber 8 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Alternatively, the different turbine stages can each be connected to the compressor stages through concentric shafts. These latter comprise several rotor blade rows associated with stator blade rows. The rotation of the rotor around its axis of rotation 14 generates a flow of air and gradually compresses it up to the inlet of the combustion chamber 10.

An inlet fan, commonly designated a fan 16, is coupled to the rotor 12 and generates an airflow which is divided into a primary flow 18 passing through the various abovementioned levels of the turbomachine, and a secondary flow 20 passing through an annular conduit (shown in part) along the length of the machine and then rejoins the main flow at the turbine outlet. The primary flow 18 and secondary flow 20 are annular flows and are channelled through the housing of the turbomachine. To this end, the housing has cylindrical walls or shells that can be internal or external.

Figure 2:
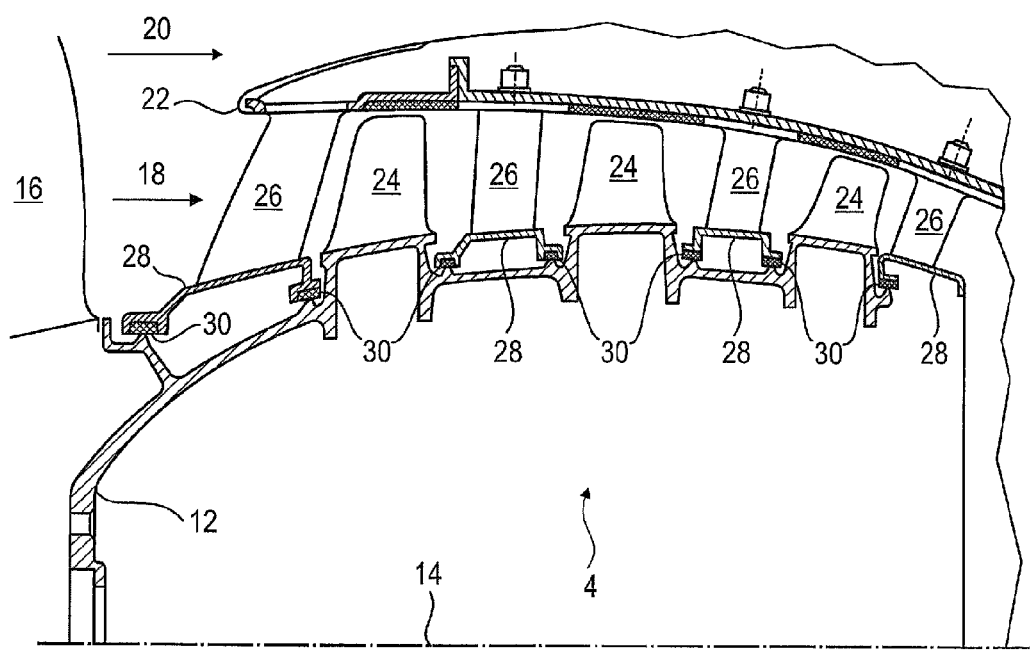
FIG. 2 shows a diagram of a turbomachine compressor according to the present application.

FIG. 2 is a sectional view of a low-pressure compressor 4 of an axial turbomachine 2 such as that of FIG. 1. Part of the turbofan 16 can be seen, as can the splitter nose 22 between the primary 18 and secondary 20 airflows. The rotor 12 comprises several rows of rotor blades 24, for example three. The low-pressure compressor 4 comprises several stators, for example four, each of which has a row of stator blades 26.

At the inner ends of these latter is fixed an inner shell 28. It has a general shape of revolution such a tube. Its outer surface helps guide the primary flow 18. To reduce leakage between the rotor 12 and a stator, layers of abradable material 30 are located on the inner side of the inner shells 28. These are intended to mate abrasively with the rotor 12 during operation. Circular paths are dug in the layers of abradable material 30 by the rotor and labyrinth seals are formed to improve sealing. The same material can be used to form a seal between the outer tips of the rotor blades 24 and the inner surface of the compressor housing.

The stators are associated with the fan 16 or a row of rotor blades for straightening the airflow so as to convert the speed of the flow into pressure. The combination of a stator and the fan 16 or a rotor blade row together forms a compression stage.

The rotor 12 has a cylindrical shape, or that of a hollow drum. It has a substantially thin wall whose thickness may be generally less than 8.00 mm, preferably less than 5.00 mm, even more preferably less than 2.00 mm. The wall is rotationally symmetrical. Following an alternative embodiment of the present application, the rotor may include disks with blades around its circumference.

The rotor 12 may be made of a metallic material such as titanium or aluminium. It can also be made of composite materials. It may be sized to cater for deformations arising from, for example, the centrifugal forces acting directly on it or that it undergoes via the rotor blades 24 it supports. Its expansion may also be taken into account.

Figure 3:
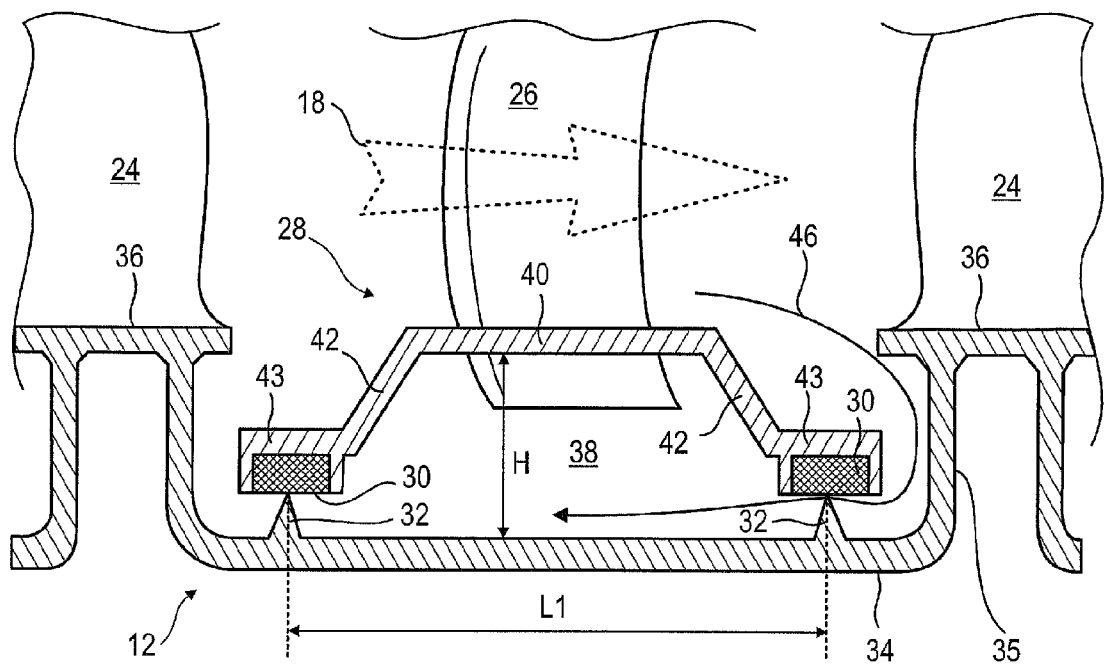
FIG. 3 illustrates a compression stage of a compressor according to a first embodiment of the present application.

FIG. 3 is an illustration of a compression stage of the turbomachine compressor 2 according to a first embodiment of the present application. The compressor may be a low-pressure compressor. The rotor 12 includes an integral drum, the stator comprising a housing formed by two half-shells which are joined when the rotor is assembled.

The rotor wall is structural and has a shape of revolution. Its profile of revolution has parts which extend substantially radially or axially. It comprises a first part 34 which extends axially and which is located facing the inner surface of the inner shell 28. The profile of the shell also includes a second part 36 which extends substantially axially and which serves as a mounting mechanism for the rotor blades 24. Upstream, the second part 36 axially overlaps the first part 34. The profile also has a joint 35 extending substantially radially and which connects the first part 34 and the second part 36. The rotor has a profile shaped like the Greek letter Π.

The shape of the wall enables inner and outer annular grooves to be formed, the depth of the outer groove being such as to house the inner shell 28 in its thickness. In this configuration, the outer surfaces of the inner shell 28 and the second part 36 are extensions of one another.

The stage has a stator blade 26 and a rotor blade 24 located downstream. Taking into account other considerations, a stage can also be formed with a rotor blade located upstream. The outer surface of the rotor 12 has annular lip seals 32. They form annular ribs extending along the circumference of the rotor 12 along a plane perpendicular to the axis of rotation 14. The compression stage has essentially two sets of lip seals 32, one being located on the upstream side of the inner shell 28 and the other on the downstream side. A set of lip seals may include one or more lip seals.

The inner shell 28 comprises a substantially thin wall, which saves weight. It is advantageously made of a composite material in order to maximise this weight saving while remaining rigid. It has a radial section with a central part 40 and a lateral part 42 on each side. The central part 40 is connected to the inner tip of the blade 26. The lateral parts 42 extend axially and radially from the central part 40 to the lip seals 32. They spread out from each other towards the interior.

The lateral parts 42 comprise lateral sub-parts 43. These are located at their inner ends. They extend axially in opposite directions, towards the exterior of the annular cavity. They each cover one set of lip seals.

The inner ends of the lateral parts 42 have inner annular grooves whose openings are towards the lip seals 32. They are advantageously filled with layers of abradable material 30. They are advantageously made on the axial ends of the lateral sub-parts 43. Alternatively, the inner ends of the lateral parts have substantially cylindrical surfaces each housing a layer of abradable material.

During assembly, the lip seals 32 have a clearance from the layers of abradable material 30, for example less than 1.00 mm, preferably more than 3.00 mm. In standard operation, they are intended to touch the abradable layer 30 and can dig into it to a depth of 0.02 mm, for example. This mode of operation corresponds, for example, to a given engine speed, with given atmospheric conditions. Centrifugal force and expansion determine to what degree the lip seals 32 and the abradable layers 30 graze each other. The proximity of the lip seals and layers of abradable material 30 maintains a seal despite deformations. This solution also maintains a seal, even after certain operating irregularities.

When the turbine engine is mounted in a vehicle such as an aircraft, it may be subject to random variations that affect the operating behaviour of the turbomachine 2. The aircraft can change direction by diving or turning. The gyroscopic force is then in opposition to the change in direction, and misaligns the rotor relative to the housing. This results in the lip seals 32 locally getting closer to the layers of abradable material 30. During the in-flight phase, the engine fan 16 can be subject to a crosswind. This exerts a force that tends to misalign the rotor relative to the housing. This too results in the lip seals 32 locally getting closer to the layers of abradable material 30. Also in operation, the turbine engine may vibrate. These vibrations can be observed on the rotor wall. This can then be deformed axially and/or radially. The amplitude of the vibrations can lead to marked contact between the layers of abradable material 30 and the lip seals 32.

Between them the lip seals 32, the outer surface of the rotor 12 and the inner surface of the inner shell 28 define an annular cavity 38. It has a radial section that is longer than it is high. Preferably, the length L1 of the radial section is greater than twice its height, preferably more than four times. A downstream leak 46 trying to get back to the upstream side of the stator must travel a greater distance. In the event of an occasional leak that length forms a cushion dampening out the leak.

The ratio between the length and the height of the radial section of the annular cavity 38 initiates movement of the air therein. The air rotates in the inner shell 28. Its average speed in a circumferential direction increases. This air is in contact with the outer surface of the rotor which gives rise to friction. To increase the effectiveness bringing this about, the surface is advantageously left rough. It can remain unfinished after rough machining or sandblasting.

The speed of the air in the annular cavity enables its pressure to decrease. This physical feature reduces the amount of leakage 46 passing upstream of the stator. Indeed, the low pressure in the cavity can approach the pressure upstream in the stator, and possibly even below that pressure.

Figure 4:
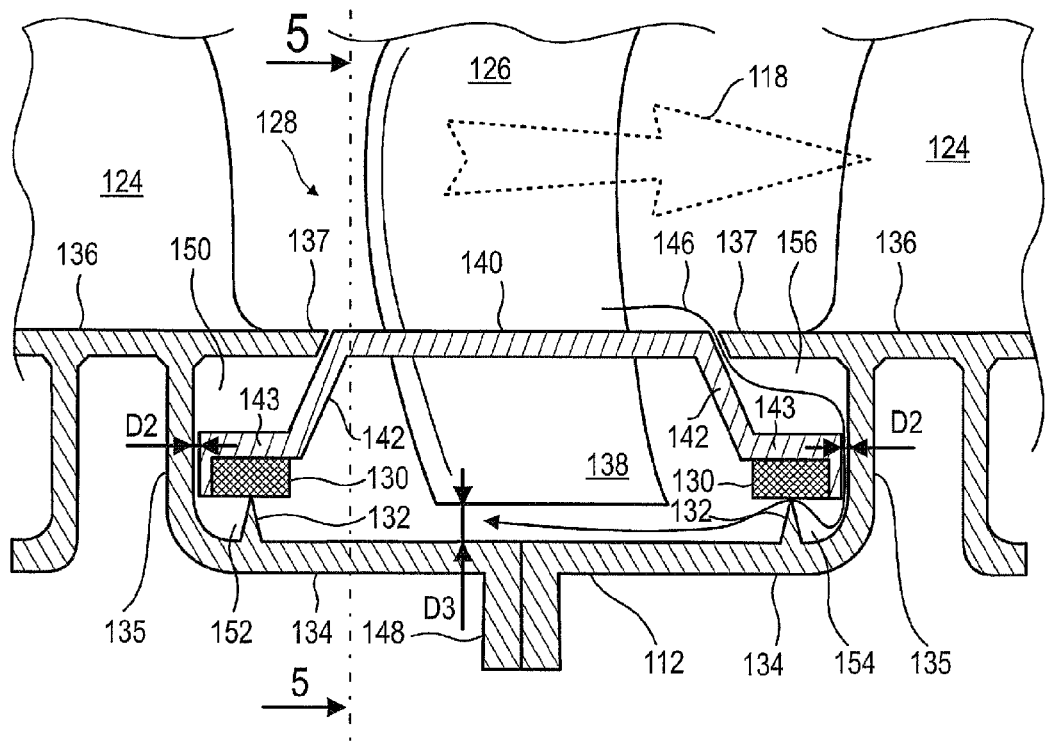
FIG. 4 illustrates a compression stage of a compressor according to a second embodiment of the present application.

FIG. 4 illustrates a compression stage of a turbomachine compressor according to a second embodiment of the present application. The compressor may be a low-pressure compressor. FIG. 4 has the same numbering scheme as in previous figures for the same or similar elements, but the numbering is incremented by 100. Specific numbers are used for items specific to this embodiment.

The rotor 112 is formed of a plurality of coaxial cylindrical segments which are arranged axially one after the other. They can be assembled using radial flanges 148. The rotor 112 may include coaxial disks. The stator includes a plurality of stator sections, the outer shells are arranged axially one after the other so as to form the outer casing of the compressor. The stator and rotor segments are assembled in turn.

The profile of the rotor wall comprises at least one third part 137, preferably two. The third part is an axial extension of the second part 136. It extends axially up to the central part 140 of the inner shell 128. The lateral part 142 extends axially to the joint 135 recessed by a distance D2 in order to permit movement or deformation during operation.

The rotor comprises two annular rows of rotor blades 124 arranged upstream and downstream of the stator. The rotor wall also has a profile of revolution with two second parts 136 and two joints 135 that may differ geometrically. The second parts 136 extend axially to the central part 140 of the inner shell 128, and lateral parts 142 extend axially to the remaining joints 135 recessed by a distance D2. The distance D2 provides for safe operation and allows for deformation of the rotor and the casing.

Thus, the layout of the inner shell 128 is divided into several annular parts, including the primary flow path, the annular cavity 138 and the annular chambers including:
  an upper annular upstream chamber 150,
  a lower annular upstream chamber 152,
  a lower annular downstream chamber 154,
  an upper annular downstream chamber 156.

These upper and lower chambers are defined by circular slots that constitute obstacles to the flow of leaks 146. The upper annular chambers are separated from the main flow by circular slots that are also designed to reduce leakage. The arrangement of the chambers and the orientation of the circular slots impose sudden changes in direction or pressure losses to the flow 146 which slows it down.

Figure 5:
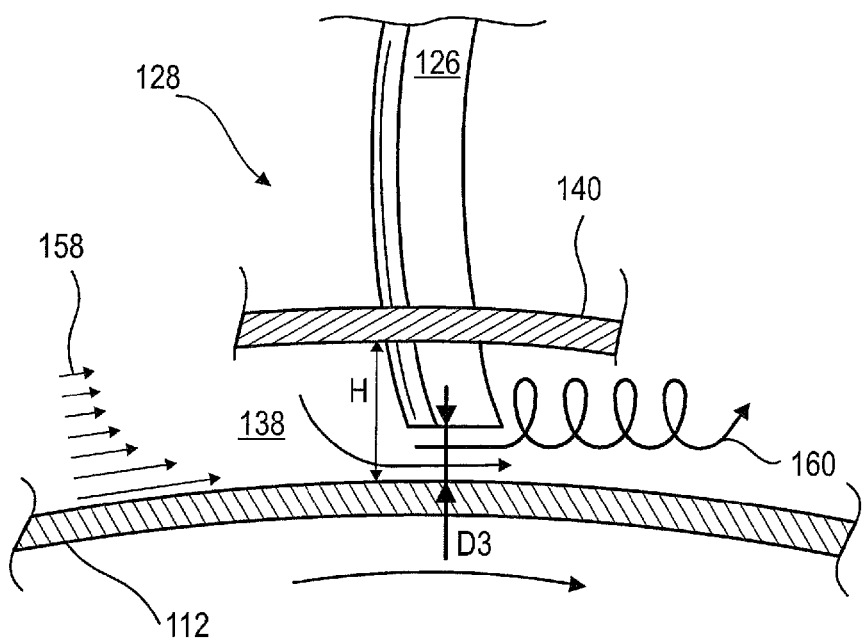
FIG. 5 is a sectional view of the stage, sectioned along axis 5-5 shown in FIG. 4.

FIG. 5 is a sectional view of part of a compressor stage, sectioned along axis 5-5 shown in FIG. 4.

The inner shell has a central part 140 to which a stator blade 126 is attached. Its inner tip extends radially inwardly, adjacent to the outer surface of the rotor 112 from which it is separated by a distance D3. Distance D3 is between 0.10 mm and 20.00 mm, preferably between 2.00 mm and 10.00 mm, more preferably between 3.00 and 5.00 mm. The distance D3 is less than or equal to the thickness of the layers of abradable material. It thus allows radial deformations of the rotor and stator. The length of the inner tips of the blades located within the interior surface of the inner shell is more than 40% of the height of the annular cavity, preferably over 70%, more preferably more than 90%.

During its rotation, the rotor causes the rotating flow 158 in the annular cavity 138. It meets the tip of the stator blade 126 and partially bypasses it from below, between its inner end and the rotor. The circular flow 158 passes through the slot thus formed and discharges, forming eddies 160. They contribute to opposing a leak, such as a local leak.

The interpretation of this can be applied to the first embodiment of the present application.

Figure 6:
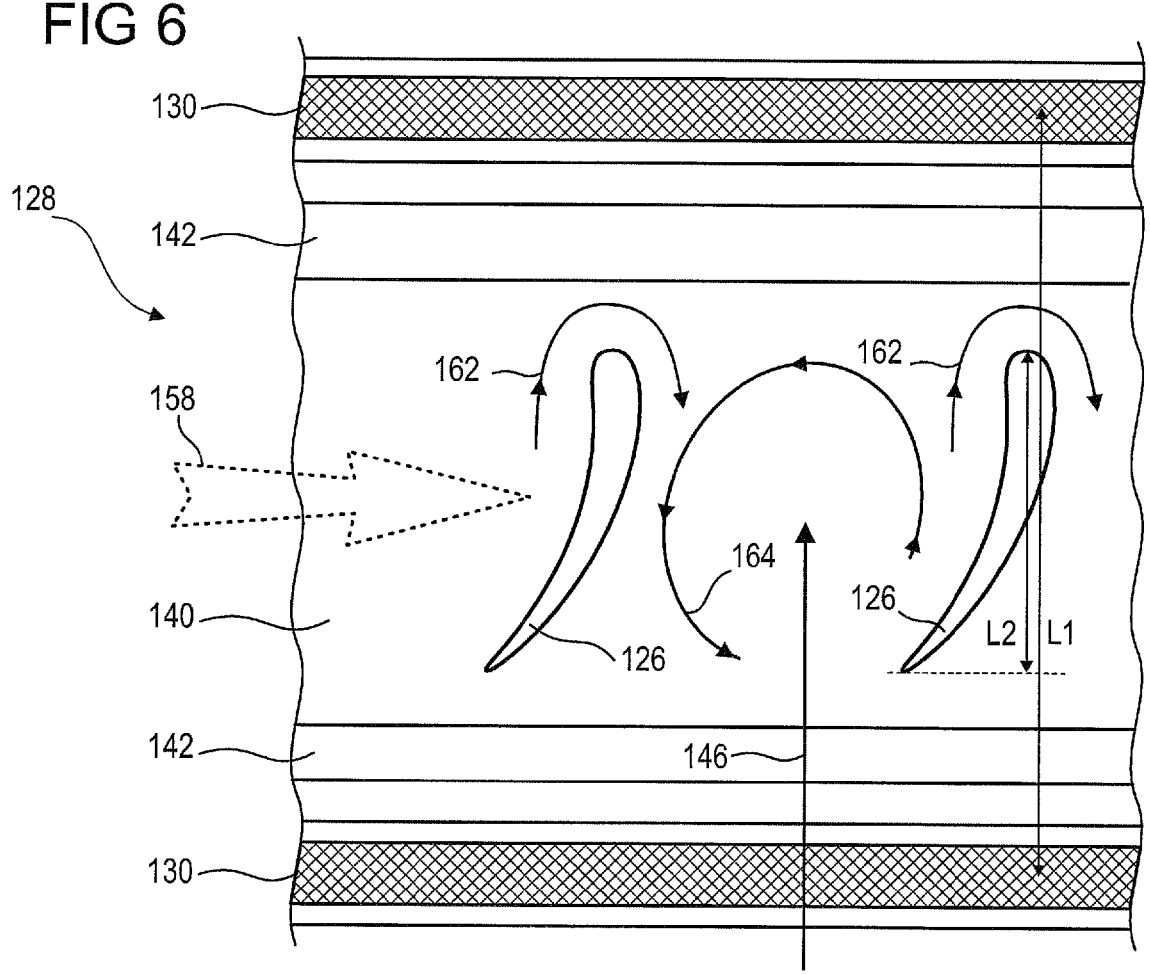
FIG. 6 is a view from the inside of an inner shell in accordance with the second embodiment of the present application.

FIG. 6 is a view of an inner shell in accordance with the second embodiment of the present application. The illustration is drawn seen from the rotor.

The inner shell 140 shows a central part to which are fixed the stator blades 126. Their inner tips extend radially inwardly from the inner surface of the inner shell and form obstacles within the annular cavity. The closer these blades are to the rotor, the more they can influence the circular flow 158 within the annular cavity.

The axial length L2 of the blades is more than 20% of the length L1 of the annular cavity, preferably over 40%, more preferably more than 60%. Furthermore, the tips of the stator blades 126 have a chord angle to the rotating flow 158, which requires that a part of the flow bypasses them on one side, for example upstream. The bypass flow 162 generated at the two blades 164 can cause a vortex between their tips. The appearance of the vortex 164 may resist the flow of a leak 146, for example a local leak. This feature of the present application therefore contributes to improving the seal between the stator and rotor.

The interpretation of this can be applied to the first embodiment of the present application.

I claim:

1. A compressor stage of an axial turbomachine, comprising:
    a rotor with, on its outer surface, at least two lip seals each forming a radial annular rib; and
    a stator which comprises:
        an annular ring of stator blades extending essentially radially;
        an inner shell whose radial cross section comprises a central part connected to the inner tips of the blades, and a lateral part extending on each side of the central part to at least one of two lip seals, respectively, thus forming an annular cavity with the rotor;
        wherein the shell and the rotor are configured so that the radial section of the annular cavity has a length L1 and a height H, the length L1 being greater than the height H.

2. The compressor stage in accordance with claim 1, wherein the length L1 of the annular cavity is greater than twice the height H of the cavity.

3. The compressor stage in accordance with claim 1, wherein the length L1 of the annular cavity is greater than three times the height H of the cavity.

4. The compressor stage in accordance with claim 1, wherein each of the lateral parts comprises:
    an axial sub-part, the said sub-parts extending in opposite directions up to their respective lip seals.

5. The compressor stage in accordance with claim 1, wherein the lateral parts diverge from each other from the central part towards the rotor.

6. The compressor stage in accordance with claim 1, wherein the inner shell is made of composite material.

7. The compressor stage in accordance with claim 1, wherein the height H of the annular cavity is constant over 70% of its length.

8. The compressor stage in accordance with claim 1, wherein the height H of the annular cavity is constant over 80% of its length.

9. The compressor stage in accordance with claim 1, wherein the ends of the lateral parts have inner annular grooves designed to house a layer of abradable material, wherein the annular grooves have inverted "U" or "L" sections; the stage comprises layers of abradable material fitted in the annular grooves.

10. The compressor stage in accordance with claim 1, wherein the ends of the lateral parts have inner annular grooves designed to house a layer of abradable material, wherein the annular grooves have inverted "U" or "L" sections and the stage comprises layers of abradable material fitted in the annular grooves.

11. The compressor stage in accordance with claim 1, wherein the inner tips of the blades extend inside the internal shell.

12. The compressor stage in accordance with claim 1, wherein the rotor has a wall with a profile of revolution which comprises:
    a first part located opposite the inner surface of the shell; and
    a second part raised relative to the first part, configured to provide support for fixing an annular rotor blade row and a joint connecting the first part to the second part, the second part at least partially axially overlapping one of the lateral parts of the inner shell, the wall comprising:
    a third part raised relative to the first part and opposite the second part, the said third part axially overlapping at least partially the other of the two lateral parts of the shell.

13. The compressor stage in accordance with claim 12, wherein the lateral parts extend axially up to the joint at a distance D2, wherein the joint is a first joint and the profile of the rotor wall comprises:
    a second joint opposite the first joint relative to the inner shell, the other of the two lateral parts of the shell extending axially to the second joint at a distance D2.

14. The compressor stage in accordance with claim 1, wherein the height of the lip seals relative to the height of the lateral parts of the shell is
    less than 30%.

15. The compressor stage in accordance with claim 1, wherein the outer surface of the rotor forming the annular cavity has a roughness Ra greater than 6.4 microns to cause air to be drawn into the said cavity.

16. The compressor stage in accordance with claim 1, wherein a distance D3 between the inner tips of the stator blades and the rotor is equal to the thickness of the layers of abradable materials measured at the lips seals; wherein the distance D3 is greater than the thickness of the layers of abradable materials.

17. The compressor stage in accordance with claim 16, wherein the distance D3 is between 0.50 mm and 5.00 mm.

18. An axial turbomachine, such as a turboprop, comprising:
    a compressor with at least one compression stage, wherein the or at least one compression stage comprises:
    a rotor with, on its outer surface, at least two lip seals each forming a radial annular rib; and
    a stator which comprises:
    an annular ring of stator blades extending essentially radially;
    an inner shell whose radial cross section comprises a central part connected to the inner tips of the blades, and a lateral part extending on each side of the central part to at least one of two lip seals, respectively, thus forming an annular cavity with the rotor;
    wherein the shell and the rotor are configured so that the radial section of the annular cavity has a length L1 and a height H, the length L1 being greater than the height H.

19. The axial turbomachine in accordance with claim 18, wherein the turbomachine includes a cylindrical housing extending axially along the length of the rotor, the rotor comprises a one-piece drum, and the housing comprises two half-shells.

20. The axial turbomachine in accordance with claim 18, wherein the turbomachine includes a cylindrical housing extending axially along the length of the rotor, and the rotor and the housing both comprise axial segments assembled axially.

* * * * *